United States Patent
Horino et al.

(10) Patent No.: US 11,846,732 B2
(45) Date of Patent: Dec. 19, 2023

(54) LIGHT DETECTION DEVICE, LIGHT DETECTION METHOD AND OPTICAL DISTANCE SENSOR

(71) Applicant: OMRON Corporation, Kyoto (JP)

(72) Inventors: Masanobu Horino, Kyotanabe (JP); Yuki Matsui, Kyoto (JP); Ken Nakamuro, Kyoto (JP); Sayuki Nakada, Nara (JP)

(73) Assignee: OMRON CORPORATION, Kyoto (JP)

( * ) Notice: Subject to any disclaimer, the term of this patent is extended or adjusted under 35 U.S.C. 154(b) by 722 days.

(21) Appl. No.: 16/977,968

(22) PCT Filed: Mar. 8, 2019

(86) PCT No.: PCT/JP2019/009228
§ 371 (c)(1),
(2) Date: Sep. 3, 2020

(87) PCT Pub. No.: WO2019/176752
PCT Pub. Date: Sep. 19, 2019

(65) Prior Publication Data
US 2021/0011139 A1  Jan. 14, 2021

(30) Foreign Application Priority Data
Mar. 15, 2018  (JP) .................. 2018-048003

(51) Int. Cl.
*G01S 7/4865* (2020.01)
*G01S 7/481* (2006.01)
*G01S 17/10* (2020.01)

(52) U.S. Cl.
CPC .......... *G01S 7/4865* (2013.01); *G01S 7/4816* (2013.01); *G01S 17/10* (2013.01)

(58) Field of Classification Search
CPC ...... G01S 7/4865; G01S 17/10; G01S 7/4816; G01S 7/4863; G01S 17/14; G01S 7/487; G01D 3/06
(Continued)

(56) References Cited

U.S. PATENT DOCUMENTS

| 2008/0158042 A1 | 7/2008 | Ishio et al. |
| 2012/0085891 A1 | 4/2012 | Beom et al. |
| 2015/0177369 A1 | 6/2015 | Kostamovaara |

FOREIGN PATENT DOCUMENTS

| JP | 2006308357 A | 11/2006 |
| JP | 2008020203 A | 1/2008 |

(Continued)

OTHER PUBLICATIONS

Translation into English of the description of JP 2006308357 (Year: 2023).*

(Continued)

*Primary Examiner* — Daniel L Murphy
(74) *Attorney, Agent, or Firm* — CANTOR COLBURN LLP

(57) ABSTRACT

A light detection device detects incident light according to a detection start timing. The light detection device includes photosensors, a signal combining circuit, a detection circuit, a time measurement circuit, and a timing extraction circuit. The photosensors receive light to generate output signals indicating light reception results, respectively. The signal combining circuit sums output signals from the respective photosensors to generate a combined signal. The detection circuit detects a timing at which the combined signal reaches a first threshold or larger to generate a detection signal. The time measurement circuit measures a count period between the detection start timing and the detected timing based on the detection signal. The timing extraction circuit extracts timing information from a predetermined period defined by (Continued)

the detected timing as a reference, the timing information indicating a timing at which the combined signal increases.

10 Claims, 12 Drawing Sheets

(58) Field of Classification Search
USPC .......................................................... 356/5.01
See application file for complete search history.

(56) References Cited

FOREIGN PATENT DOCUMENTS

| | | | |
|---|---|---|---|
| JP | 2011226922 | A | 11/2011 |
| JP | 2012084877 | A | 4/2012 |
| JP | 5644294 | B2 | 12/2014 |

OTHER PUBLICATIONS

Translation into English of the claims of JP 2006308357 (Year: 2023).*
International Search Report for International Application No. PCT/JP2019/009228; dated Apr. 2, 2019.
Written Opinion of the International Searching Authority for International Application No. PCT/JP2019/009228; dated Apr. 2, 2019.

\* cited by examiner

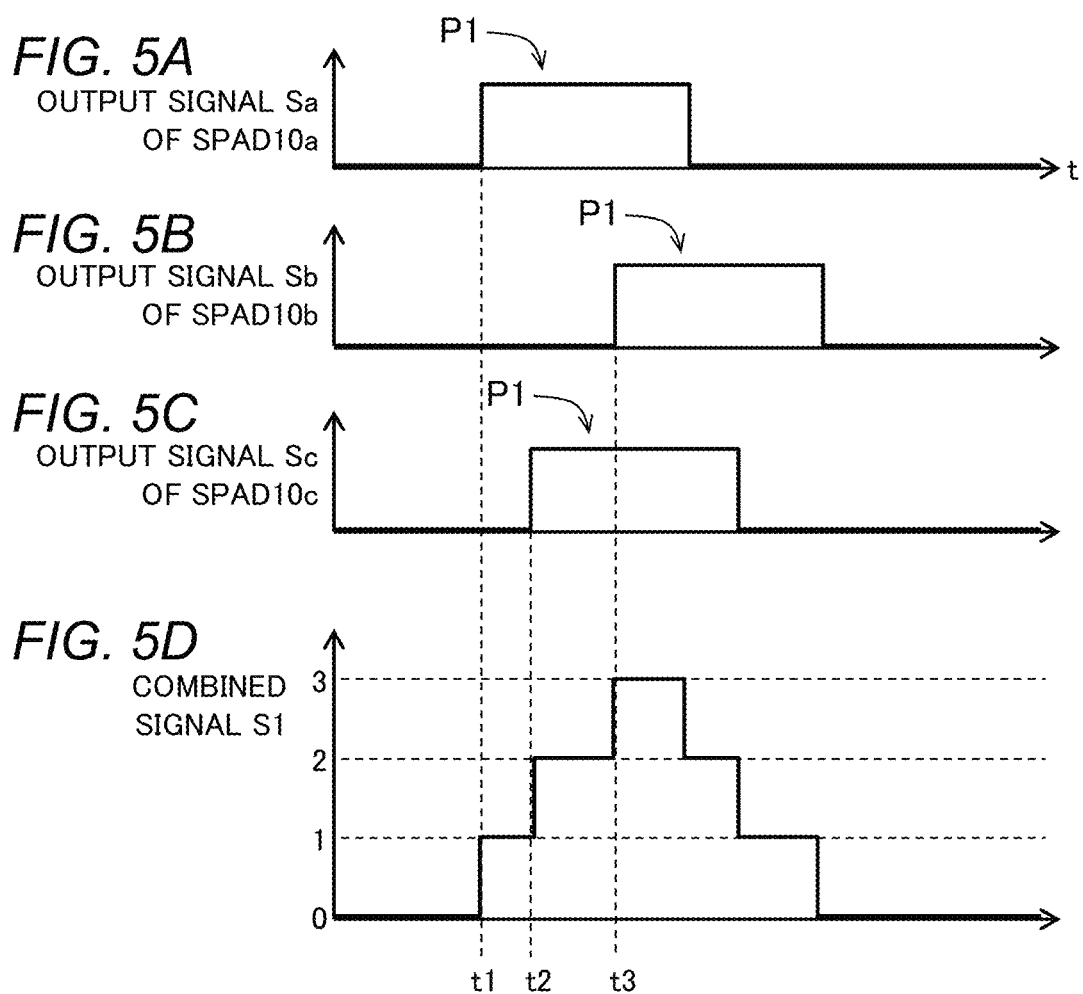

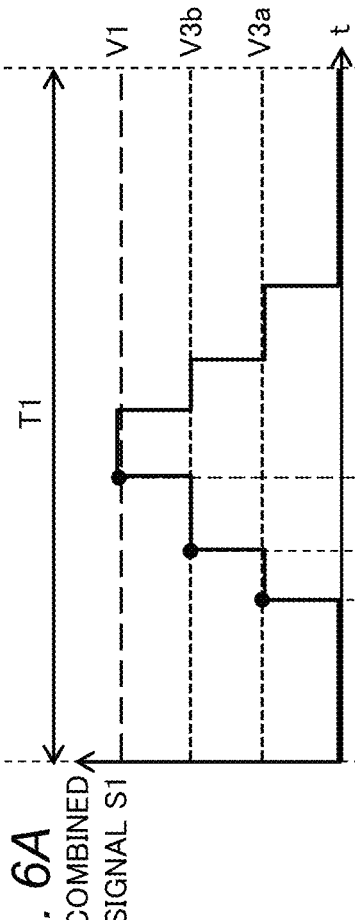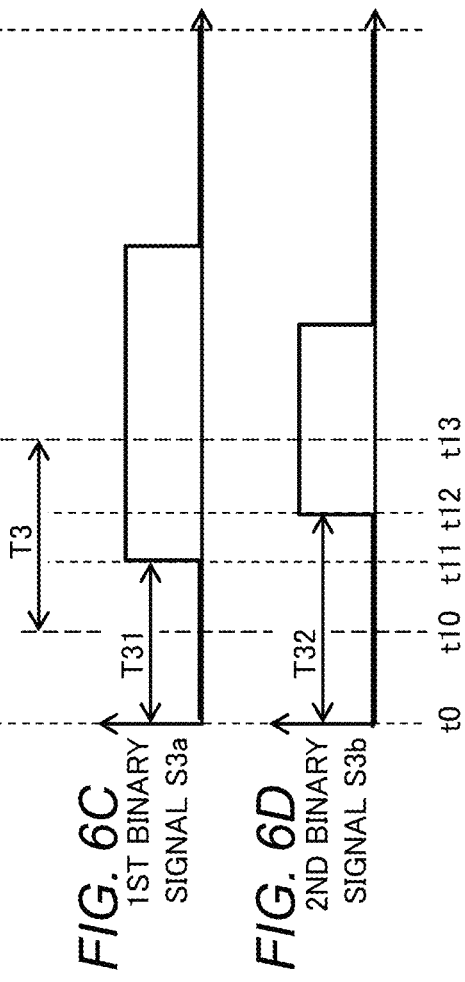

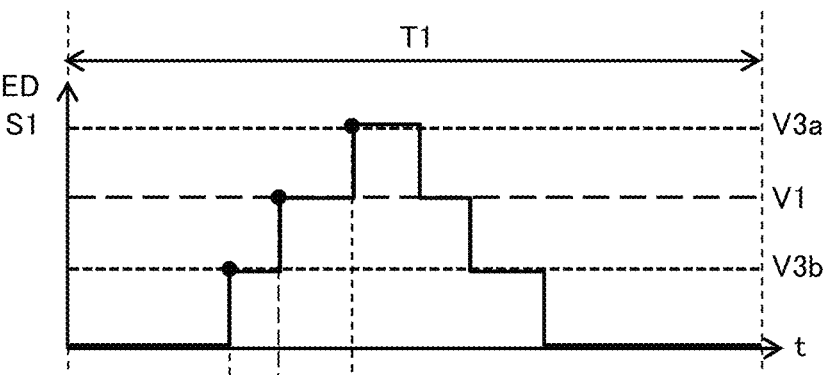
FIG. 8A COMBINED SIGNAL S1
FIG. 8B DETECTION SIGNAL S2
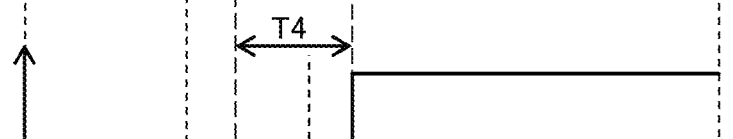
FIG. 8C DELAYED DETECTION SIGNAL S2A
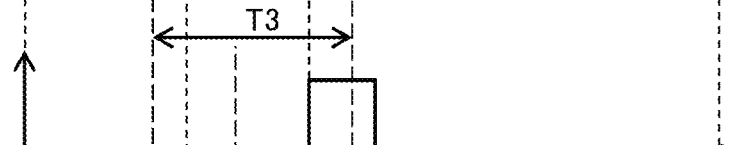
FIG. 8D 1ST BINARY SIGNAL S3a
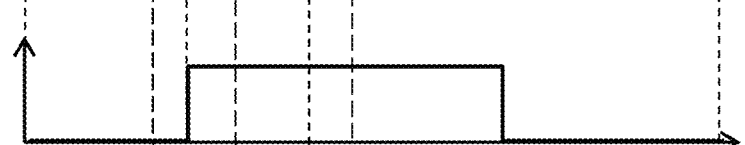
FIG. 8E 2ND BINARY SIGNAL S3b

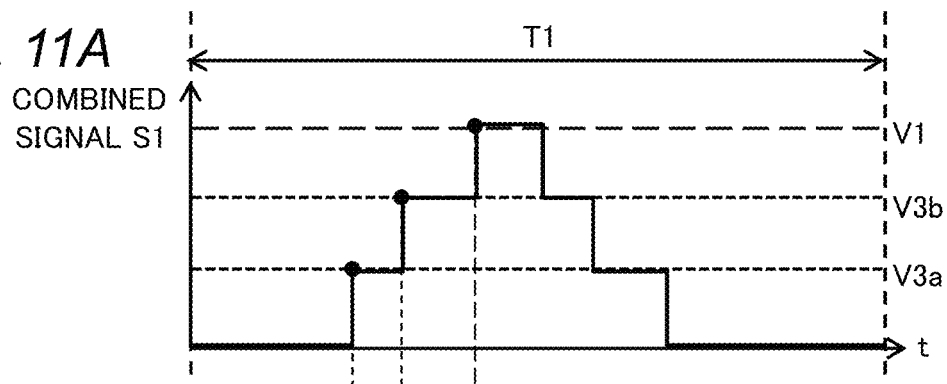
FIG. 11A COMBINED SIGNAL S1
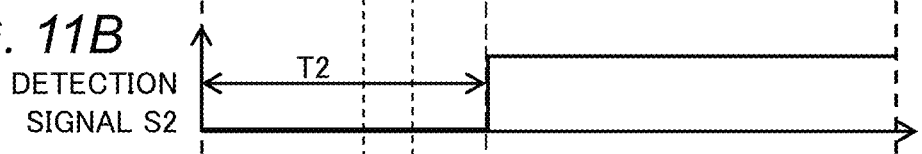
FIG. 11B DETECTION SIGNAL S2
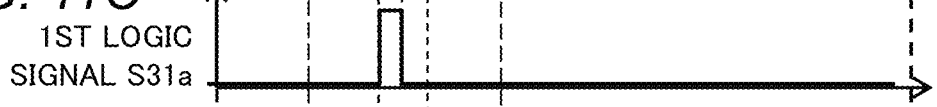
FIG. 11C 1ST LOGIC SIGNAL S31a
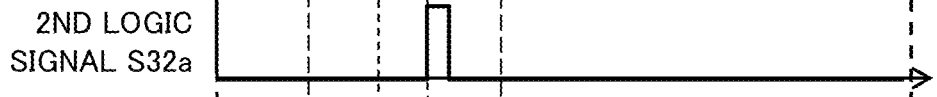
FIG. 11D 2ND LOGIC SIGNAL S32a
FIG. 11E INTEGRATED SIGNAL S30
FIG. 11F TIMING INFORMATION D30
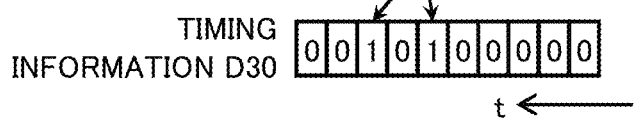

LIGHT DETECTION DEVICE, LIGHT DETECTION METHOD AND OPTICAL DISTANCE SENSOR

CROSS REFERENCE TO RELATED APPLICATIONS

This is the U.S. national stage of application No. PCT/JP2019/009228, filed on Mar. 8, 2019. Priority under 35 U.S.C. § 119(a) and 35 U.S.C. § 365(b) is claimed from Japanese Application No. 2018-048003, filed Mar. 15, 2020, the disclosure of which is also incorporated herein by reference.

TECHNICAL FIELD

The present disclosure relates to a light detection device, a light detection method, and an optical distance sensor including the light detection device.

BACKGROUND ART

There is known an optical distance sensor that uses time of flight (TOF) of light. The optical distance sensor irradiates an object with light and detects the light reflected by the object, thereby measuring a distance corresponding to the time of fight of light traveling back and forth to the object. For the optical distance sensor, a technique using a single photon avalanche photodiode (SPAD) for light detection is proposed (e.g., Patent Documents 1 and 2).

Patent Document 1 discloses a light detector including a plurality of SPADs in an optical distance measurement device. The light detector of Patent Document 1 sums rectangular pulses output from the plurality of SPADs, compares a summed output value with a predetermined reference value, and outputs a trigger signal according to a comparison result.

Patent Document 2 discloses a distance measurement device including a plurality of SPADs in a receiver unit. The distance measurement device of Patent Document 2 determines that a measurement pulse is detected when a summated signal indicating the sum of electrical pulses output from the plurality of SPAD crosses a predetermined threshold and a rising slope of the summated signal crosses a predetermined slope threshold.

CITATION LIST

Patent Document

Patent Document 1: JP 5644294 B
Patent Document 2: US 2015/0177369 A1

SUMMARY

Technical Problem

In the related art such as Patent Document 1, the detection target is one timing per each light detection by using the plurality of SPADs, with the aim of knowing the total number of photons simultaneously detected by the plurality of SPADs. Since the reaction of the SPAD to the photon is stochastic, it is desirable to obtain a plurality of timings when the plurality of SPADs are caused to receive light simultaneously, in order to accurately perform the light detection using statistical processing, for example.

An object of the present disclosure is to provide a light detection device, a light detection method, and an optical distance sensor capable of facilitating light detection accurately in an optical distance sensor.

Solution to Problem

A light detection device according to the present disclosure detects incident light according to a detection start timing. The light detection device includes a plurality of photosensors, a signal combining circuit, a detection circuit, a time measurement circuit, and a timing extraction circuit. The plurality of photosensors receive light to generate output signals indicating light reception results, respectively. The signal combining circuit sums a plurality of output signals from the respective photosensors to generate a combined signal. The detection circuit detects a timing at which the combined signal reaches a first threshold or larger to generate a detection signal indicating the detected timing. The time measurement circuit measures a count period between the detection start timing and the detected timing based on the detection signal. The timing extraction circuit extracts timing information from a predetermined period defined by the detected timing as a reference, the timing information indicating a timing at which the combined signal increases.

A light detection method according to the present disclosure provides a method by which a light detection device detects incident light according to a detection start timing.

An optical distance sensor according to the present disclosure includes a light projector that projects light, and a light detection device. The time measurement circuit in the light detection device measures the count period using a timing at which the light projector projects light as the detection start timing.

Advantageous Effect

With the light detection device, the light detection method, and the optical distance sensor according to the present disclosure, it is possible to facilitate the light detection accurately in the optical distance sensor.

BRIEF DESCRIPTION OF THE DRAWINGS

FIG. 5A to FIG. 5D are timing charts for describing a method of combining a combined signal in the light detection device.

FIG. 6A to FIG. 6F are timing charts illustrating an operation of the light detection device according to the first embodiment.

FIG. 8A to FIG. 8E are timing charts illustrating an operation of the light detection device according to the second embodiment.

FIG. 11A to FIG. 11F are timing charts illustrating an operation of the light detection device according to the third embodiment.

DETAILED DESCRIPTION

Hereinafter, embodiments of a light detection device, a light detection method, and an optical distance sensor according to the present disclosure will be described with reference to the accompanying drawings. Note that, the same components are denoted by the same reference signs in each of the following embodiments.

Application Example

Figure 1:
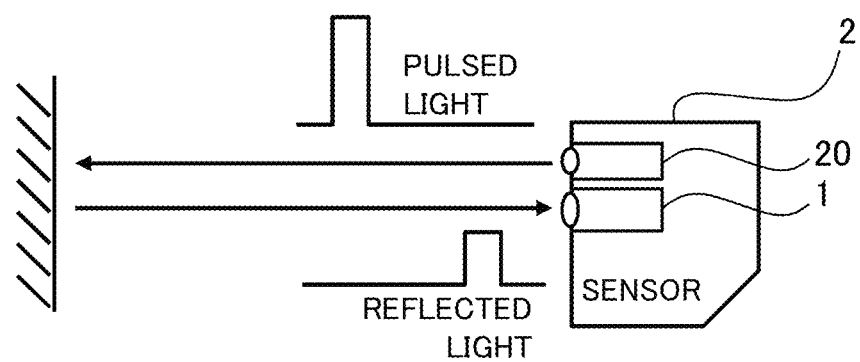
FIG. 1 is a view for describing an application example of a light detection device according to the present disclosure.

An example to which a light detection device according to the present disclosure can be applied will be described with reference to FIG. 1. FIG. 1 is a view for describing an application example of a light detection device 1 according to the present disclosure.

The light detection device 1 according to the present disclosure is applied to a TOF-type optical distance sensor 2. The optical distance sensor 2 includes a light projector 20 that projects pulsed light to the outside, for example, as illustrated in FIG. 1. The light detection device 1 constitutes a receiver unit, which receives light from the outside, in the optical distance sensor 2.

The optical distance sensor 2 according to the present disclosure can be applied to a photoelectric sensor for industrial automation applications, for example. The optical distance sensor 2 detects reflected light of the pulsed light projected from the light projector 20 using the light detection device 1 to measure a distance to an object that reflects the light based on time of flight of the light. The optical distance sensor 2 can detect whether the object is located at a specific position.

In the present application example, for improving the sensitivity of light detection or the like in the optical distance sensor 2, an SPAD is used as a sensor element i.e. a photosensor in the light detection device 1 from the viewpoint of increasing the sensitivity of light detection in the optical distance sensor 2. The SPAD is highly sensitive enough to respond to the incidence of one photon. However, the detection may have variations because the reaction is stochastic. In view of suppressing the detection variations of the SPAD in the present application example, a plurality of timings are acquired when the light detection device 1 performs one light detection using a plurality of SPADs simultaneously, so as to facilitate highly accurate light detection.

Configuration Example

Hereinafter, embodiments as configuration examples of the light detection device 1 and the optical distance sensor 2 will be described.

First Embodiment

In a first embodiment, the optical distance sensor 2 and the light detection device 1 that detects local timings near a timing at which the number of SPADs having received light reaches a detection threshold or more will be described.

1. Configuration

The configurations of the optical distance sensor 2 and the light detection device 1 according to the first embodiment will be described hereinafter.

1-1. Configuration of Optical Distance Sensor

Figure 2:
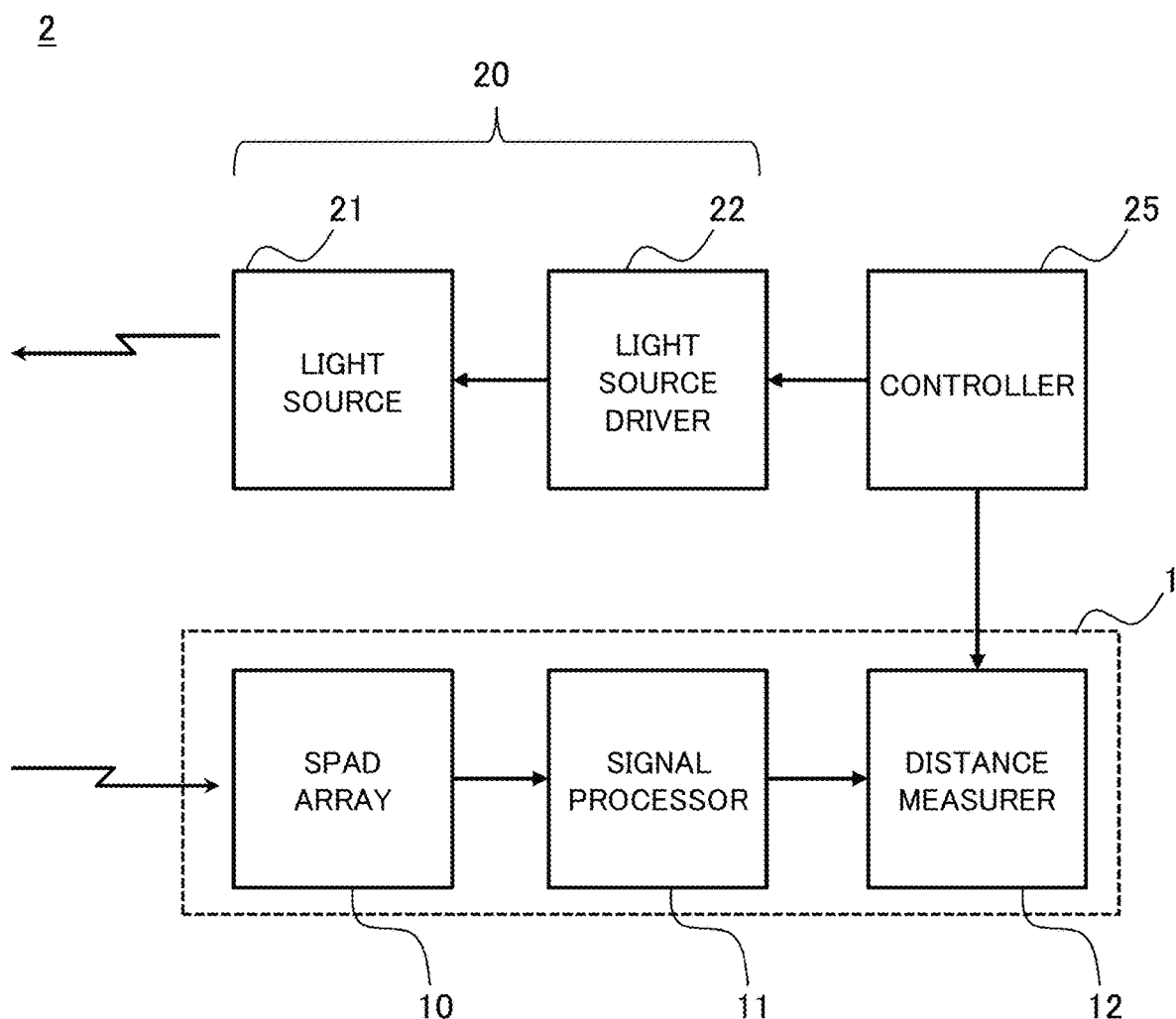
FIG. 2 is a block diagram illustrating a configuration of an optical distance sensor according to a first embodiment.

The configuration of the optical distance sensor 2 according to the present embodiment will be described with reference to FIG. 2. FIG. 2 is a block diagram illustrating the configuration of the optical distance sensor 2.

The optical distance sensor 2 includes the light projector 20, a controller 25, and the light detection device 1, for example, as illustrated in FIG. 2. The light projector 20 includes, for example, a light source 21 and a light source driver 22.

In the light projector 20, the light source 21 includes, for example, an LD (laser diode) or an LED. The light source 21 emits light such as infrared light. The light source driver 22 is a circuit that drives the light emission of the light source 21. The light source driver 22 causes the light source 21 to emit light of a pulse shape, that is, pulsed light, at a timing controlled by the controller 25. The pulsed light has a pulse width of, for example, several nanoseconds to several tens of nanoseconds.

The controller 25 includes, for example, a CPU, a RAM, a ROM, and the like, and controls each component. For example, the controller 25 generates various control signals so as to control the whole operation of the optical distance sensor 2.

As illustrated in FIG. 2, the light detection device 1 includes a SPAD array 10, a signal processor 11, and a distance measurer 12, for example. The light detection device 1 includes, for example, an amplifier that amplifies an electric signal generated by the SPAD in response to incident light, a drive circuit for the SPAD, and the like, in the SPAD array 10 or the signal processor 11.

The SPAD array 10 is configured by arranging a plurality of SPADs in an array form. Each SPAD of the SPAD array 10 is implemented by operating an avalanche photodiode (APD) in a Geiger mode.

The signal processor 11 performs signal processing to detect a timing at which light as a detection target of the light detection device 1 arrives, based on the output signal output from the SPAD array 10. The distance measurer 12 calculates a distance value indicating a distance according to time of flight of light based on a signal processing result of the signal processor 11. Details of the configuration of the light detection device 1 will be described hereinafter.

1-2. Configuration of Light Detection Device

Figure 3:
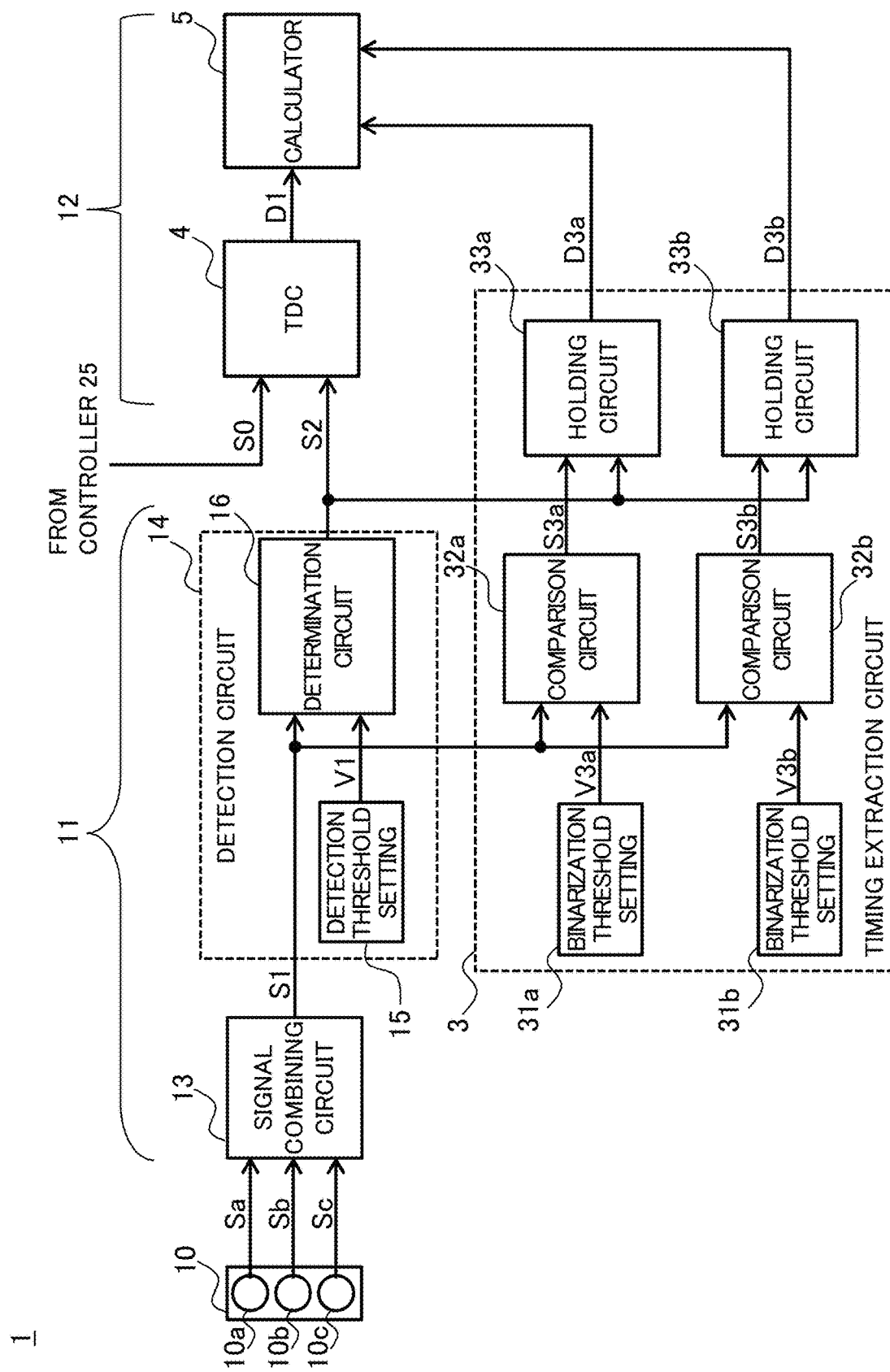
FIG. 3 is a block diagram illustrating a configuration of a light detection device according to the first embodiment.

A configuration example of the light detection device 1 according to the first embodiment will be described with reference to FIG. 3 and FIG. 4. FIG. 3 is a block diagram illustrating the configuration of the light detection device 1 according to the present embodiment.

As illustrated in FIG. 3, the light detection device 1 of the present embodiment includes a plurality of SPADs 10a to 10c that constitute the SPAD array 10, and a signal combining circuit 13, a detection circuit 14, and a timing extraction circuit 3 that constitute a signal processor 11. In addition, the light detection device 1 includes, for example, a TDC (time/digital converter) 4 and a calculator 5 which constitute the distance measurer 12.

The SPADs 10a to 10c are examples of photosensors that stochastically respond to photons incident in the light detection device 1. Hereinafter, an example in which the number of the SPADs 10a to 10c in the SPAD array 10 is three will be described.

Each of the SPADs 10a, 10b, and 10c receives light and generates output signals Sa, Sb, and Sc, indicating a light reception result, respectively. For example, a waveform shaping circuit, which shapes signal waveforms of the output signals Sa to Sc of the SPADs 10a to 10c into rectangular pulse shapes, is appropriately incorporated in the light detection device 1. The respective output signals Sa to Sc from the SPAD array 10 are input to the signal combining circuit 13 of the signal processor 11.

The signal combining circuit 13 sums up the plurality of output signals Sa to Sc thus input therein to generate a combined signal S1. The signal combining circuit 13 outputs the combined signal S1 thus generated to the detection circuit 14 and the timing extraction circuit 3. The signal combining circuit 13 can be configured by applying a known technique (for example, see Patent Document 1).

Based on the combined signal S1 from the signal combining circuit 13, the detection circuit 14 detects the timing of the light obtained as a detection target of the light detection device 1, to generate a detection signal S2 indicating a detection result. As illustrated in FIG. 3, the detection circuit 14 includes a detection threshold setting circuit 15 and a determination circuit 16, for example.

The detection threshold setting circuit 15 sets a predetermined detection threshold V1 to the determination circuit 16. The detection threshold V1 indicates a reference to determine a timing of simultaneous detection in the plurality of SPADs 10a to 10. The detection threshold V1 is an example of a first threshold in the present embodiment.

The determination circuit 16 includes, for example, a comparator and a logic circuit. The determination circuit 16 compares and determines the combined signal S1 and the detection threshold V1, and generates the detection signal S2 according to a determination result. The determination circuit 16 of the present embodiment generates the detection signal S2 indicating a determination result on whether or not the combined signal S1 reaches the detection threshold V1 or larger. The detection signal S2 is input to the TDC 4 and the timing extraction circuit 3.

The timing extraction circuit 3 of the present embodiment includes one or more binarization threshold setting circuits 31a and 31b (generically referred to as a "binarization threshold setting circuit 31"), one or more comparison circuits 32a and 32b (generically referred to as a "comparison circuit 32"), and one or more holding circuits 33a and 33b (generically referred to as a "holding circuit 33"). Hereinafter, an example in which the timing extraction circuit 3 includes two sets of the binarization threshold setting circuit 31, the comparison circuit 32, and the holding circuit 33 will be described.

As to the binarization threshold setting circuit 31, the first binarization threshold setting circuit 31a sets, for example, a first binarization threshold V3a smaller than the detection threshold V1 to the first comparison circuit 32a. In addition, the second binarization threshold setting circuit 31b sets a second binarization threshold V3b to the second comparison circuit 32b, the second binarization threshold V3b being larger than the first binarization threshold V3a and smaller than the detection threshold V1, for example.

Each of the binarization thresholds V3a and V3b indicates a reference to determine a timing at which the reaction of the SPADs 10a to 10c changes near the timing detected by the detection threshold V1, for example. Each of the binarization thresholds V3a and V3b (generically referred to as a "binarization threshold V3") is an example of a second threshold in the present embodiment.

The combined signal S1 from the signal combining circuit 13 is input to the comparison circuit 32 of the timing extraction circuit 3. The first comparison circuit 32a compares the combined signal S1 with the first binarization threshold V3a, and generates, for example, a first binary signal S3a indicating whether or not the combined signal S1 is equal to or larger than the first binarization threshold V3a. The first comparison circuit 32a outputs the generated first binary signal S3a to the first holding circuit 33a.

Similarly to the first binary signal S3a, the second comparison circuit 32b generates a second binary signal S3b according to a result of the comparison of the combined signal S1 with the second binarization threshold V3b, and outputs the second binary signal S3b to the second holding circuit 33b. Hereinafter, the first and second binary signals S3a and S3b are generically referred to as a "binary signal S3".

The detection signal S2 from the detection circuit 14 is input to the holding circuit 33 of the timing extraction circuit 3. The first and second holding circuits 33a, 33b respectively hold first and second timing information D3a and D3b (generically referred to as "timing information D3") indicating signal states of the respective binary signals S3a and S3b for a predetermined holding period with the detection signal S2 as a reference. The holding period is, for example, several nanoseconds to several tens of nanoseconds. A configuration example of the holding circuit 33 is illustrated in FIG. 4.

Figure 4:
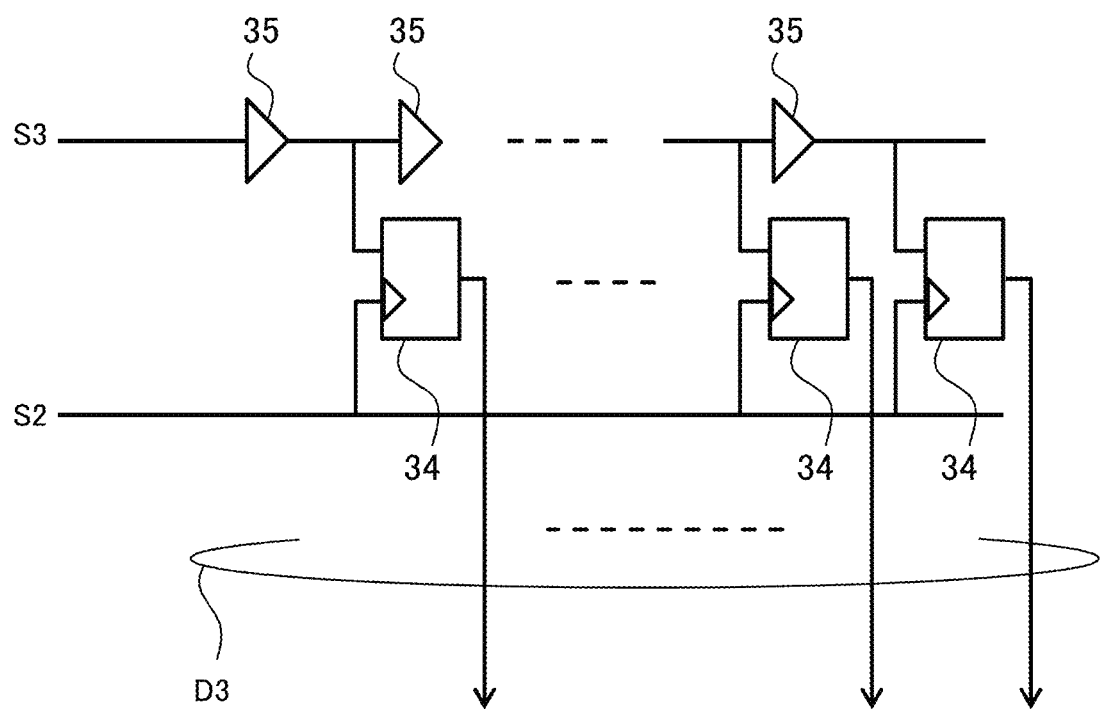
FIG. 4 is a circuit diagram illustrating a configuration example of a holding circuit in the light detection device.

In the configuration example of FIG. 4, the holding circuit 33 includes a plurality of storage elements 34 and a plurality of delay elements 35 connected in series with each other. Each of the storage elements 34 is connected to one delay element 35 at an input terminal and holds a binary value of "0" or "1". It is desirable that each of the delay elements 35 have a common delay period (for example, several tens of picoseconds to several hundreds of picoseconds).

In the holding circuit 33 in the example of FIG. 4, the binary signal S3 from the comparison circuit 32 is input to a series circuit of the delay elements 35. The detection signal S2 from the detection circuit 14 is input to a control terminal of each of the storage elements 34. Each of the storage elements 34 takes in and holds the binary signal S3 output to the corresponding delay element 35 in accordance with the timing indicated by the detection signal S2. As a result, the holding circuit 33 can hold the timing information D3 indicating a signal state of the binary signal S3 for each delay period in the holding period terminated at the timing indicated by the detection signal S2.

Returning to FIG. 3, a detection start timing signal S0 is input to the TDC 4 from the controller 25. The detection start timing signal S0 is an example of a control signal indicating a timing at which the operation of the TDC 4 is started.

The TDC 4 is an example of a time measurement circuit that generates time information as a digital value (time/digital conversion) to measure time. The TDC 4 measures a count period that is from the timing indicated by the detection start timing signal S0 to the timing indicated by the detection signal S2 based on the detection start timing signal S0 and the detection signal S2, and generates time information D1 indicating the count period as a measurement result.

The calculator 5 includes, for example, a CPU that executes various arithmetic processes in cooperation with software, a RAM, a ROM, and the like. The calculator 5 operates as the distance measurer 12 together with the TDC 4. The calculator 5 acquires the time information D1 from the TDC 4 and also acquires the respective timing information D3a and D3b from the respective holding circuits 33a and 33b of the timing extraction circuit 3. The calculator 5 executes arithmetic processing to calculate a distance according to the time of flight of light based on the acquired time information D1 and timing information D3a and D3b. The arithmetic processing includes, for example, various types of statistical processing and the like.

Note that hardware resources such as the CPU constituting the calculator 5 may be shared by the controller 25 of the optical distance sensor 2 or may be separately provided. In addition, the calculator 5, the controller 25, and the like may be configured by various hardware circuits such as an ASIC and an FPGA.

2. Operation

The operations of the optical distance sensor 2 and the light detection device 1 configured as described above will be described hereinafter.

In the optical distance sensor 2, the controller 25 (FIG. 2) controls the light source driver 22 of the light projector 20 to cause the light source 21 to emit pulsed light at predetermined time intervals, for example. When the projected pulsed light is reflected by an object which is a distance measurement target of the optical distance sensor 2, the projected pulsed light can be incident onto the optical distance sensor 2 as the reflected light.

At the time of controlling the light projector 20, the controller 25 generates the detection start timing signal S0 indicating the timing for light projection, and outputs the detection start timing signal S0 to the TDC 4 (FIG. 3) of the distance measurer 12.

In synchronization with the light projection of the light projector 20, the light detection device 1 in the optical distance sensor 2 performs light detection to detect the reflected light of the pulsed light during a predetermined light reception period from the timing at which light is projected. The light reception period is set to a period shorter than the time interval of the pulsed light, for example, and may be set in view of the time of flight of light corresponding to an upper limit of a distance to be measured (for example, the light reception period of 200 ns for the distance upper limit of 30 m).

In the light detection of the light detection device 1, the SPAD array 10 receives light, and the signal processor 11 performs signal processing on a signal as a light reception result, thereby generating the detection signal S2 indicating the timing when the reflected light arrives. Based on the detection signal S2, the distance measurer 12 measures the time of flight, taken until the projected pulsed light is reflected by the object and received by the TDC 4, as a count period. The distance measurer 12 can calculate a distance value by multiplying, for example, half of the measured count period by the speed of light.

By using the SPADs 10a to 10c in the light detection device 1 in the above optical distance sensor 2, it is possible to increase the sensitivity of light detection and improve the accuracy of the distance measurement. However, since the detection of photons by the SPADs 10a to 10c is stochastic, stochastic detection variations is conceivable in the situation where the plurality of SPADs 10a to 10c detect photons simultaneously for one light projection.

To solve this, the light detection device 1 of the present embodiment acquires a plurality of timings for one detection start timing by comparison and determination using the detection threshold V1 of the detection circuit 14 and each of the binarization thresholds V3a and V3b of the timing extraction circuit 3, and performs the statistical processing in the distance measurer 12. Hereinafter, details of the operation of the light detection device 1 of the present embodiment will be described.

2-1. Operation of Light Detection Device

Details of the operation of the light detection device 1 according to the present embodiment will be described with reference to FIG. 5 and FIG. 6.

FIG. 5A to FIG. 5D are timing charts for describing a method of combining the combined signal S1 in the light detection device 1. FIG. 6A to FIG. 6F are timing charts illustrating the operation of the light detection device 1.

In the light detection device 1 (FIG. 3) of the present embodiment, the SPADs 10a to 10c receive light in the respective stochastic operations and generate the output signals Sa, Sb, and Sc, respectively. The signal waveforms of the output signals Sa, Sb, and Sc are illustrated in FIG. 5A, FIG. 5B, and FIG. 5C, respectively.

In the example of FIG. 5A to FIG. 5C, each of the output signals Sa to Sc is a rectangular pulse P1 having a predetermined pulse width. Each of the SPADs 10a to 10c stochastically reacts to incident photons, so that the rectangular pulse P1 is generated in each of the output signals Sa to Sc.

In the example of FIG. 5A to FIG. 5C, the output signal Sa of the first SPAD 10a rises at time t1 (FIG. 5A), and the output signal Sb of the second SPAD 10b rises at time t3 after time t1 (FIG. 5B). In addition, the output signal Sa of the third SPAD 10a rises at time t2 between time t1 and time t3 (FIG. 5C).

The signal combining circuit 13 sums up the output signals Sa to Sc from the SPADs 10a to 10c to generate the combined signal S1. The combined signal S1 based on the output signals Sa to Sc in FIG. 5A to FIG. 5C is illustrated in FIG. 5D.

The combined signal S1 illustrated in FIG. 5D is the sum of the three output signals Sa to Sc (FIG. 5A to FIG. 5C) at the same time. For example, the sum of the combined signal S1 is one according to the output signal Sa of FIG. 5A from time t1 to time t2.

In addition, the combined signal S1 in the example of FIG. 5D increases from "1" to "2" at time t2 by the sum of the two rectangular pulses P1 (FIG. 5A and FIG. 5C). The combined signal S1 further increases to "3" at time t3 by the sum of the three rectangular pulses P1 (FIG. 5A to FIG. 5C). In this manner, a signal level of the combined signal S1 changes according to the number of the SPADs 10a to 10c with light received.

The relationship between the combined signal S1 combined as described above and the various thresholds V1, V3a, and V3b is illustrated in FIG. 6A. Hereinafter, an example will be described in which the light projector 20 projects light at time t0 and the light detection device 1 performs light detection during a light reception period T1 from time t0 as illustrated in FIG. 6A to FIG. 6D. In this case, the detection start timing signal S0 indicating time t0 is input from the controller 25 to the TDC 4.

The combined signal S1 in the example of FIG. 6A increases after time t0, reaches the first binarization threshold V3a at time t11, reaches the second binarization threshold V3b at time t12, and reaches the detection threshold V1 at time t13. In the light detection device 1, the combined signal S1 is input to the detection circuit 14 and the timing extraction circuit 3.

The detection circuit 14 compares the combined signal S1 and the detection threshold V1 to generate the detection signal S2. At the same time, the comparison circuits 32a and 32b of the timing extraction circuit 3 compare the combined signal S1 and the binarization thresholds V3a and V3b, respectively, and generate the respective binary signals S3a and S3b. FIG. 6B, FIG. 6C, and FIG. 6D illustrate the detection signal S2, the first binary signal S3a, and the second binary signal S3b, respectively, based on the combined signal S1 of the example of FIG. 6A.

At time t11, the combined signal S1 reaches the first binarization threshold V3a, so that the first binary signal S3a switches from "0" to "1" as illustrated in FIG. 6C. Similarly, at time t12, the second binary signal S3b switches from "0" to "1" as illustrated in FIG. 6D. The binary signals S3a and S3b are sequentially input to the holding circuits 33a and 33b, respectively.

At time t13 after time t12, the combined signal S1 reaches the detection threshold V1, so that the detection signal S2 rises as illustrated in FIG. 6B. Then, the TDC 4 performs measurement (time/digital conversion) of a period T2 from time t0 indicated by the detection start timing signal S0 to time t13 at which the detection signal S2 rises as a count period. The TDC 4 holds the time information D1 indicating the measured count period T2.

In addition, in response to the rising of the detection signal S2 at time t13, the respective holding circuits 33a and 33b of the timing extraction circuit 3 hold the timing information D3a and D3b on the binary signals S3a and S3b input after time t10, which is earlier than time t13 by a holding period T3. The timing information D3a and D3b holding the binary signals S3a and S3b in FIG. 6C and FIG. 6D are illustrated in FIG. 6E and FIG. 6F, respectively.

In FIG. 6E and FIG. 6F, a newer signal state is illustrated on the left side of the drawing in accordance with the arrangement order of the storage elements 34 of FIG. 4. In FIG. 6E, "1" is recorded on the left side of the drawing in accordance with the binary signal S3a of FIG. 6C being "1" from time t11 to time t13 at the end. In FIG. 6F, a section where "1" is recorded is shorter than that in FIG. 6E in accordance with the binary signal S3b in FIG. 6D being "1" from time t12, which is after time t11.

According to the timing information D3a, D3b of FIG. 6E and FIG. 6F, it is possible to identify timings t11 and t12, at which the combined signal S1 reaches the respective binarization thresholds V3a and V3b or larger, relative to time t13 at the end. Each piece of the timing information D3a and D3b is input to the calculator 5.

The calculator 5 performs an operation for distance measurement based on the time information D1 indicating the count period T2 and the timing information D3a and D3b. For example, first, the calculator 5 converts the relative time information based on the timing information D3a and D3b into absolute time information with the detection start timing time t0 as a reference. Specifically, the calculator 5 calculates periods T31 and T32 from time t0 to times t11 and t12, respectively, as illustrated in FIG. 6C and FIG. 6D based on, for example, the count period T2 and the length of the section of "1" in the timing information D3a and D3b.

Further, the calculator 5 executes predetermined statistical processing based on the count period T2 of the TDC 4 and the periods T31 and T32 calculated from the timing information D3. For example, the calculator 5 calculates an average value of the plurality of periods T2, T31, and T32 for one-time projection and reception of light to calculate the time of flight of light or a corresponding distance value.

In addition, the calculator 5 may perform statistical processing using a histogram or the like by accumulating the time information D1 and the timing information D3 obtained by a plurality of times of projection and reception of light in a RAM or the like, and may calculate a distance value according to a peak position of the histogram, for example. It is possible to efficiently increase the number of histogram samples using the time information D1 and the timing information D3.

According to the above operation of the light detection device 1, when time t13 at which simultaneous light reception is performed by the plurality of SPADs 10a to 10b is detected based on the combined signal S1 obtained by combining the output signals Sa to Sc of the SPADs 10a to 10c, the timing information D31 and D32 indicating times t11 and t12 at which the combined signal S1 has increased immediately before time t13 can be further acquired. As a result, the plurality of timings t11 to t13 at which the plurality of SPADs 10a to 10c react in one-time projection and reception of light are obtained. Thus, it is possible to facilitate the light detection accurately in the optical distance sensor 2.

3. Summary

As described above, the light detection device 1 according to the present embodiment detects incident light according to the predetermined detection start timing. The light detection device 1 includes the plurality of SPADs 10a to 10c, the signal combining circuit 13, the detection circuit 14, the TDC 4, and the timing extraction circuit 3. The plurality of SPADs 10a to 10c receive light and generate the respective output signals Sa to Sc indicating the light reception results. The signal combining circuit 13 sums up the plurality of output signals Sa to Sc from the SPADs 10a to 10c to generate the combined signal S1. The detection circuit 14 detects the timing at which the combined signal S1 is equal to or larger than the detection threshold V1, which is an example of the first threshold, and generates the detection signal S2 indicating the detected timing. The TDC 4 measures the count period T2 that is a period between the detection start timing and the detected timing based on the detection signal S2. The timing extraction circuit 3 extracts the timing information D3a and D3b indicating whether or not the combined signal S1 is equal to or larger than the binarization thresholds V3a and V3b, which are examples of the second threshold, in the predetermined holding period T3 defined by the detected timing as a reference.

According to the light detection device 1 described above, it is possible to facilitate the light detection accurately in the optical distance sensor 2 by acquiring the timing information D3a and D3b in addition to the count period T2.

In the present embodiment, the photosensors of the light detection device 1 are the SPADs 10a to 10c that stochastically react to the incident photons. Even if each of the SPADs 10a to 10c operates stochastically, it is possible to accurately perform the light detection using the timing information D3.

In the present embodiment, the light detection device 1 further includes the calculator 5. The calculator 5 calculates the periods T31 and T32 from the detection start timing to the timing indicated by the timing information, based on the extracted timing information D3a and D3b and the measured count period T2. The calculator 5 executes the statistical processing based on the calculated periods T31 and T32 and the count period T2. With the statistical processing, it is possible to implement highly accurate distance measurement.

In the present embodiment, the timing extraction circuit 3 includes the comparison circuit 32 and the holding circuit 33. The comparison circuit 32 is provided for each binarization threshold V3 and generates the binary signal S3 indicating whether or not the combined signal S2 is equal to or larger than the binarization threshold V3. The holding circuit 33 is provided for each comparison circuit 32, and holds the timing information D3 which is based on the binary signal S3 obtained from the comparison circuit 32 for the holding period T3 until the timing indicated by the detection signal S2. As a result, the timing information D3 based on each of the binary signals S3 can be acquired.

In addition, the optical distance sensor 2 according to the present embodiment includes the light projector 20 that projects light, and the light detection device 1. The TDC 4 of the light detection device 1 measures the count period T2 using the timing at which the light projector 20 projects light as the detection start timing. According to the optical distance sensor 2 of the present embodiment, it is possible to accurately perform the light detection in the light detection device 1 and to improve the accuracy of the distance measurement.

In addition, the light detection method according to the present embodiment is a method by which the light detection device 1 including the plurality of SPADs 10a to 10c detects incident light according to a predetermined detection start timing. The present method includes: receiving light at the plurality of SPADs 10a to 10c to generate each of the output signals Sa to Sc indicating the light reception result; and summing up the plurality of output signals Sa to Sc to generate the combined signal S1. Further, the present method includes: detecting a timing at which the combined signal S1 is equal to or larger than a predetermined first threshold to generate the detection signal S2 indicating the detected timing; and measuring the count period T2 between the detection start timing and the detected timing based on the detection signal S2. Further, the present method includes acquiring the timing information D3, which indicates the timing indicating whether the combined signal S1 is equal to or larger than at least one second threshold in the holding period T3 based on the detected timing. According to the present method, it is possible to facilitate the light detection accurately in the optical distance sensor 2.

In the above description, the example in which the number of the SAPDs 10a to 10c included in the light detection device 1 is three has been described. The number of SAPDs 10a to 10c included in the light detection device 1 may be four or more, or may be two.

In addition, the example in which the timing extraction circuit 3 of the light detection device 1 includes two sets of the respective circuits 31, 32, and 33 has been described in the above description. The timing extraction circuit 3 of the light detection device 1 may include three or more sets of the respective circuits 31 to 33, or may include one set of the respective circuits 31 to 33. In addition, there may be a plurality of sets of the detection circuit and the timing extraction circuit.

Second Embodiment

In the first embodiment, the timing information D3 indicates a timing in the holding period that is terminated at the timing indicated by the detection signal S2, but timing information acquired by a light detection device is not limited thereto. In a second embodiment, a configuration example of the above light detection device will be described with reference to FIG. 7 and FIG. 8.

Figure 7:
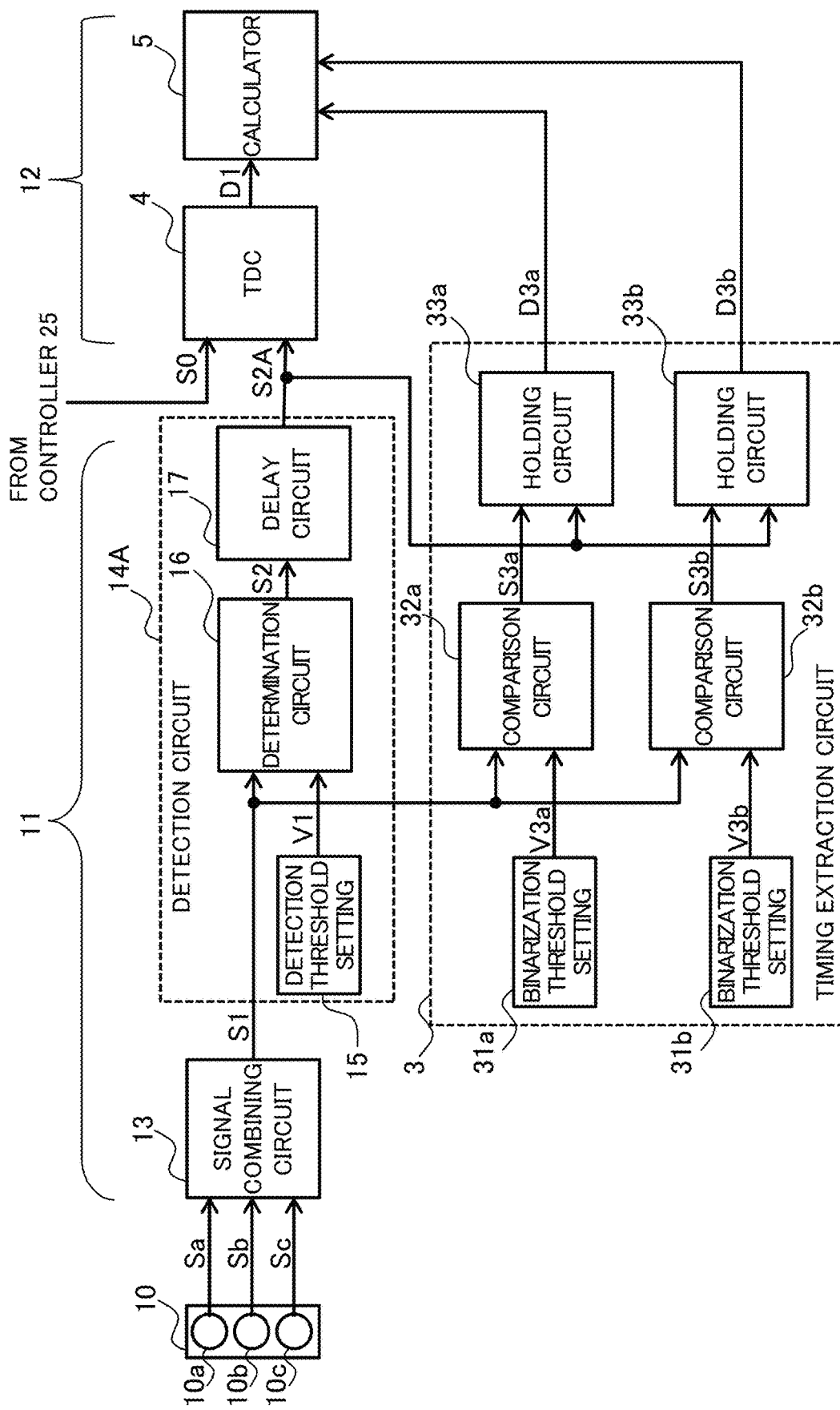
FIG. 7 is a block diagram illustrating a configuration of a light detection device according to a second embodiment.

FIG. 7 is a block diagram illustrating a configuration of a light detection device 1A according to the second embodiment. In a light detection device 1A according to the present embodiment, a detection circuit 14A further includes a delay circuit 17 in addition to a configuration similar to that of the light detection device 1 of the first embodiment (FIG. 3) as illustrated in FIG. 7.

In the detection circuit 14A of the present embodiment, the delay circuit 17 delays the detection signal S2 output from the determination circuit 16 by a predetermined delay period (for example, several hundred picoseconds to several nanoseconds) to generate a delayed detection signal S2A. In the present embodiment, instead of the detection signal S2 from the determination circuit 16, the delayed detection signal S2A from the delay circuit 17 is output to the TDC 4 and the holding circuits 33a and 33b of the timing extraction circuit 3.

FIG. 8A to FIG. 8E are timing charts illustrating an operation of the light detection device 1A according to the second embodiment. FIG. 8A is an example of a timing chart of the combined signal S1. FIG. 8B illustrates the detection signal S2 based on the combined signal S1 of FIG. 8A. FIG. 8C illustrates the delayed detection signal S2A based on the detection signal S2 of FIG. 8B. FIG. 8D and FIG. 8E respectively illustrate first and second binarization signals S3a and S3b based on the combined signal S1 of FIG. 8A.

In the present configuration example, the first binarization threshold V3a is set to a value larger than the detection threshold V1 as illustrated in FIG. 8A. In other words, the detection threshold V1 is set to a value smaller than one of the plurality of binarization thresholds V3a and V3b. For example, setting the detection threshold V1 to be small may be advantageous from the viewpoint of enabling detection even when the number of photons during light reception is small in the light detection device 1A.

The combined signal S1 in the example of FIG. 8A increases after time t0, reaches the detection threshold V1 at time t21, and then, reaches the first binarization threshold V3a at time t22. Therefore, the detection signal S2 in FIG. 8B rises at time t21 before time t22, at which the binary signal S3a in FIG. 8D rises. On the other hand, the delayed detection signal S2A, which is delayed by a delay period T4 of the delay circuit 17 from time t21, rises at time t23 after time t22 as illustrated in FIG. 8C.

According to the light detection device 1A of the present embodiment, the respective holding circuits 33a and 33b of the timing extraction circuit 3 hold the timing information D3a and D3b for the holding period T3 terminated at time t23 indicated by the delayed detection signal S2A. As a result, it is possible to acquire the timing information D3a indicating the timing at which the combined signal S1 reaches the binarization threshold V3a or larger, after time t21 at which the combined signal S1 reaches the detection threshold V1 or larger.

As described above, in the light detection device 1A according to the present embodiment, the detection circuit 14A delays the detection signal S2 by the predetermined delay period to output the delayed signal to the holding circuit 33 as the delayed detection signal S2A. One of the binarization thresholds V3 is larger than the detection threshold V1. As a result, it is possible to acquire the timing information D3 indicating the timing at which the signal increases after the timing indicated by the detection signal S2. The number of the binarization thresholds V3 larger than the detection threshold V1 is not limited to one and may be plural. In addition, every binarization threshold V3 may be larger than V1.

Third Embodiment

In the first embodiment, the configuration example has been described that the light detection device 1 is provided with the holding circuits 33a and 33b for each binarization threshold V3 to hold the plurality of pieces of timing information D3a and D3b. In the present embodiment, a light detection device that integrally holds timing information of the plurality of binarization thresholds V3a and V3b will be described with reference to FIG. 9 to FIG. 11.

Figure 9:
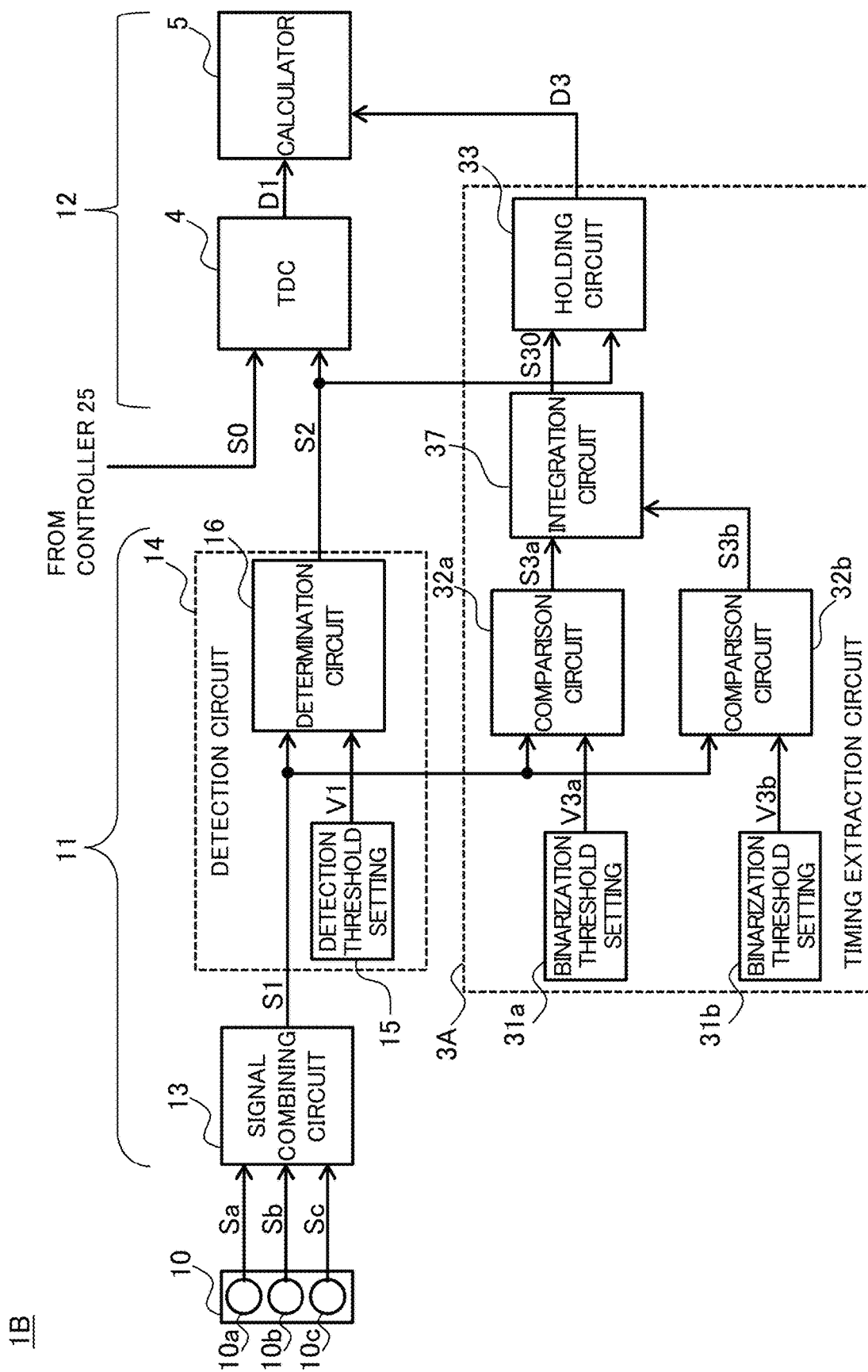
FIG. 9 is a block diagram illustrating a configuration of a light detection device according to a third embodiment.

FIG. 9 is a block diagram illustrating a configuration of a light detection device 1B according to the third embodiment. The light detection device 1B according to the present embodiment is obtained by changing a configuration of a timing extraction circuit 3A as illustrated in FIG. 9 from a configuration similar to that of the light detection device 1 of the first embodiment (FIG. 3). The timing extraction circuit 3A of the present embodiment includes an integration circuit 37, which is configured to integrate the plurality of binary signals S3a and S3b, and one holding circuit 33, instead of the plurality of holding circuits 33a and 33b in the configuration similar to that of the first embodiment.

The integration circuit 37 generates an integrated signal S30 that indicates a timing of each comparison result in an integrated manner based on the plurality of binary signals S3a and S3b from the comparison circuits 32a and 32b. A configuration example of the integration circuit 37 is illustrated in FIG. 10.

Figure 10:
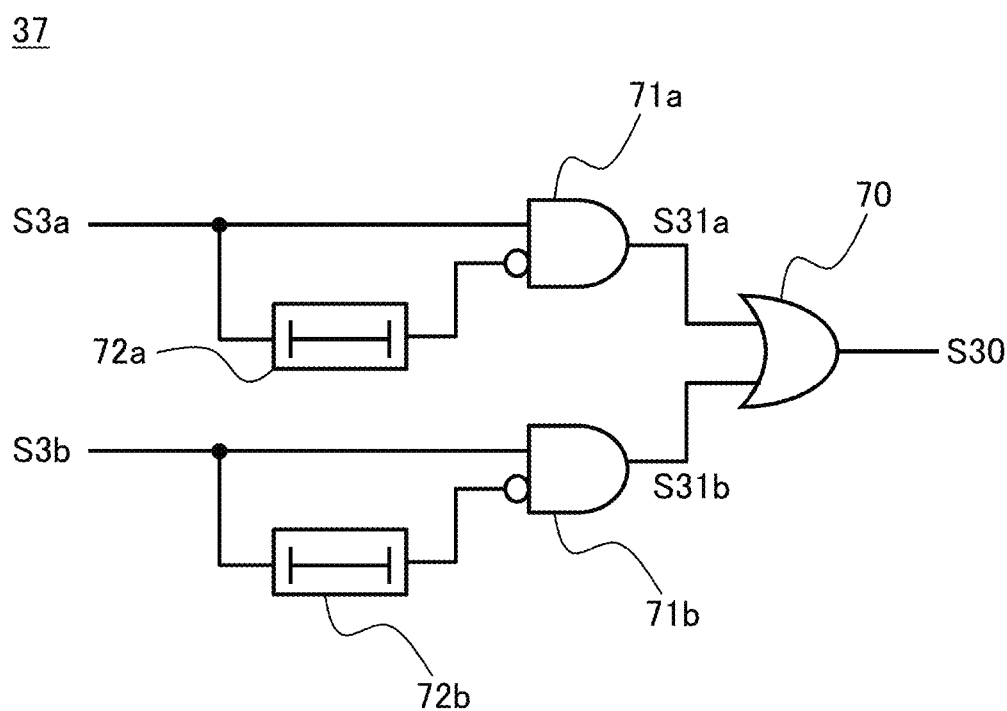
FIG. 10 is a circuit diagram illustrating a configuration example of an integration circuit in the light detection device.

In the configuration example of FIG. 10, the integration circuit 37 includes a plurality of logic gates 71a and 71b and a plurality of delay elements 72a and 72b, provided for each of the comparison circuits 32, and one OR gate 70. It is desirable that each of the delay elements 72a and 72b have a common delay period.

The first logic gate 71a calculates a logical product between the first binary signal S3a and an inverted signal of a delayed result of the same binary signal S3a by the delay element 72a, to generate a first logic signal S31a. Similarly, the second logic gate 71b generates a second logic signal S31b based on the second binary signal S3b. The logic signals S31a and S31b are input to the OR gate 70. The OR gate 70 calculates a logical sum of the plurality of logic signals S31a and S31b to generate the integrated signal S30 indicating a calculation result.

FIG. 11A to FIG. 11F are timing charts illustrating an operation of the light detection device 1B according to the third embodiment. FIG. 11A is an example of a timing chart of the combined signal S1. FIG. 11B illustrates the detection signal S2 based on the combined signal S1 of FIG. 11A. FIG. 11C and FIG. 11D respectively illustrate first and second logic signals S31a and S31b based on the combined signal S1 of FIG. 11A. FIG. 11E illustrates the integrated signal S30 based on the logic signals S31a and S31b of FIG. 11C and FIG. 11D. FIG. 11F illustrates the timing information D3 based on the integrated signal S30 of FIG. 11E.

According to the integration circuit 37, the logic signals S31a and S31b form rectangular pulses as illustrated in FIG. 11C and FIG. 11D, in response to timings t11 and t12 at which the combined signal S1 reaches the binarization thresholds V3a and V3b or larger with the binary signals S3a and S3b rising. The rectangular pulse of each of the logic signals S31a and S31b has a pulse width corresponding to the delay period of the delay elements 72a and 72b.

The integration circuit 37 obtains the logical sum of the logic signals S31a and S31b of FIG. 11C and FIG. 11D based on the binary signals S3a and S3b to generate the integrated signal S30. According to the integrated signal S30, each rectangular pulse of the logic signals S31a and S31b of FIG. 11C and FIG. 11D is included as illustrated in FIG. 11E.

As the integrated signal S30 is held as the timing information D3, "1" is recorded in accordance with the timings t11 and t12 at which the logic signals S31a and S31b rise as illustrated in FIG. 11F. As a result, the information amount equivalent to the plurality of pieces of timing information D3a and D3b in the first embodiment can be obtained with one piece of the timing information D3. In addition, the circuit area corresponding to the holding circuit 33 can be reduced.

As described above, the timing extraction circuit 3A includes the plurality of comparison circuits 32, the integration circuit 37, and the holding circuit 33 in the light detection device 1B according to the present embodiment. The comparison circuit 32 is provided for each second threshold and generates the binary signal S3 indicating whether or not the combined signal S1 is equal to or larger than the second threshold. The integration circuit 37 generates the integrated signal S30 that indicates the timings of the respective comparison results in an integrated manner based on the plurality of binary signals S3 from the respective comparison circuits 32. The holding circuit 33 holds the timing information D3 in the holding period T3 until the timing indicated by the detection signal S2 based on the integrated signal S30. As a result, it is possible to acquire the timing information D3 integrating the plurality of comparison results.

Other Embodiments

The example in which the detection threshold V1 is a constant value has been described in each of the above embodiments. In the light detection device of the present embodiment, the detection threshold V1 may be set based on the maximum value of the combined signal S1. A modification of the detection threshold setting circuit 15 when the detection threshold V1 is set based on the maximum value of the combined signal S1 will be described with reference to FIG. 12.

Figure 12:
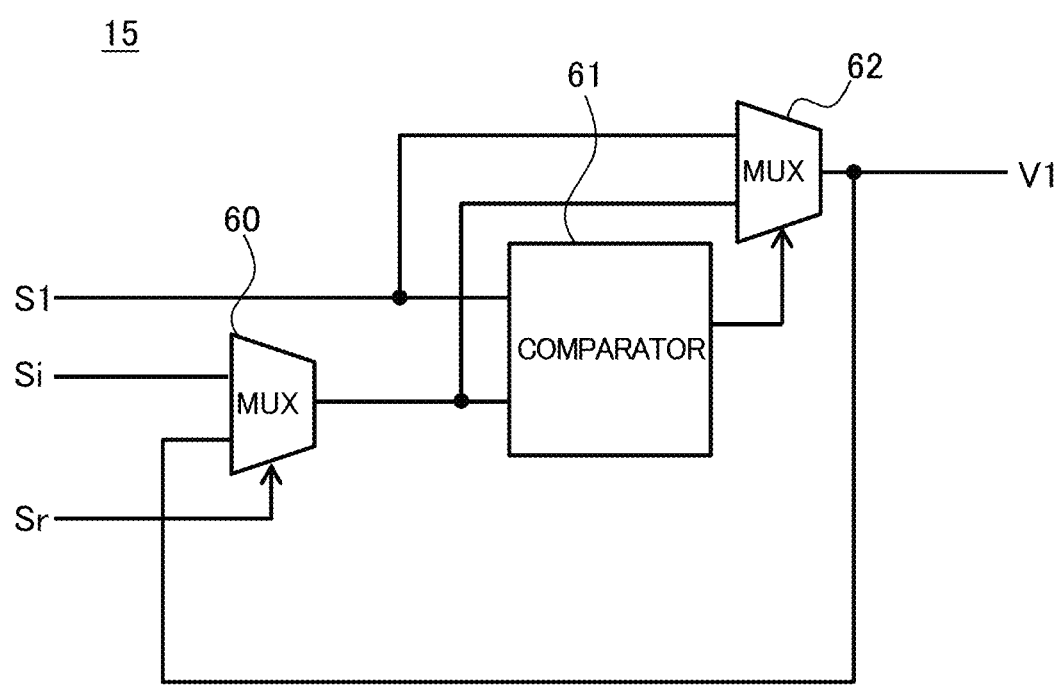
FIG. 12 is a circuit diagram illustrating a modification of a detection threshold setting circuit in the light detection device.

As illustrated in FIG. 12, the detection threshold setting circuit 15 of the present modification includes a comparator 61 and two multiplexers 60 and 62, for example. The detection threshold setting circuit 15 holds the maximum value of the input combined signal S1 as the detection threshold V1, and outputs the held detection threshold V1.

The combined signal S1 from the signal combining circuit 13 is input to the comparator 61 and the multiplexer 62 in the detection threshold setting circuit 15. The multiplexer 60 outputs an initial value signal Si indicating an initial value or the detection threshold V1 to the comparator 61 and the multiplexer 62.

The comparator 61 compares the combined signal S1 with the signal output from the multiplexer 60. The comparator 61 outputs a signal indicating a comparison result to a control terminal of the multiplexer 62.

The multiplexer 62 switches a signal to be output to an input terminal of the multiplexer 60 between the combined signal S1 and the initial value signal Si or the detection threshold V1 output from the multiplexer 60, according to the comparison result of the comparator 61.

According to the detection threshold setting circuit 15 of the above configuration example, every time the combined signal S1 updates the maximum value, the updated detection threshold V1 can be generated. The detection circuit 14 in the light detection device 1 of the present modification compares and determines, for example, the detection threshold V1 output from the detection threshold setting circuit 15 of FIG. 12 with the combined signal S1 delayed appropriately using the determination circuit 16 to generate the detection signal S2. The controller 25 may output a reset signal Sr, for example, immediately before light projection or the like to set the detection threshold V1 to the initial value.

The configuration example in which the photosensors of the light detection devices 1 to 1B are the SPADs 10a to 10c has been described in each of the above embodiments. In the present embodiment, the photosensor of the light detection device is not necessarily the SPAD.

In addition, the configuration examples of the light detection devices 1 to 1B that extract the timing information D3 by binarization using the binarization threshold V2 has been described in each of the above embodiments. The light detection device of the present embodiment may acquire timing information on an increase of the combined signal S1 in the holding period or the like without using the binarization threshold V2.

In addition, the application example of the optical distance sensor 2 for industrial automation applications has been illustrated in the above description. The application of the optical distance sensor 2 and the light detection devices 1 to 1B according to the present disclosure is not limited thereto, and may be, for example, in-vehicle applications. The optical distance sensor 2 may be, for example, a LiDAR or a distance image sensor.

(Appendix)

As described above, various embodiments of the present disclosure have been described, but the present disclosure is not limited to the above contents, and various modifications can be made within a range where the technical idea is substantially the same. Hereinafter, various aspects according to the present disclosure will be additionally described.

A first aspect according to the present disclosure is a light detection device (1) for detecting incident light according to a detection start timing. The light detection device 1 includes a plurality of photosensors (10a to 10c), a signal combining circuit (13), a detection circuit (14), a time measurement circuit (4), and a timing extraction circuit (3). The plurality of photosensors receive light to generate output signals (Sa to Sc) indicating light reception results, respectively. The signal combining circuit sums a plurality of output signals from the respective photosensors to generate a combined signal (S1). The detection circuit detects a timing at which the combined signal reaches a first threshold or larger (V1) to generate a detection signal (S2) indicating the detected timing. The time measurement circuit measures a count period between the detection start timing and the detected timing based on the detection signal. The timing extraction circuit extracts timing information (D3) from a predetermined period (T3) defined by the detected timing as a reference, the timing information indicating a timing at which the combined signal increases.

As a second aspect, in the light detection device of the first aspect, the photosensor is a single photon avalanche photodiode (SPAD) configured by an avalanche photodiode operated in a Geiger mode.

As a third aspect, the light detection device according to the first or second aspect further includes a calculator (5). The calculator calculates a period from the detection start timing to the timing indicated by the timing information based on the extracted timing information and the measured count period.

As a fourth aspect, in the light detection device according to the third aspect, the calculator executes statistical processing based on the calculated period and the count period.

As a fifth aspect, in the light detection device according to any one of the first to fourth aspects, the timing extraction circuit includes at least one comparison circuit (32) and a holding circuit (33). The comparison circuit corresponds to a second threshold and generates a binary signal (S3) indicating whether or not the combined signal is the second threshold or larger. The holding circuit corresponds to each comparison circuit, and holds timing information which is based on the binary signal obtained from a corresponding comparison circuit for predetermined period until the timing indicated by the detection signal.

As a sixth aspect, in the light detection device according to any one of the first to fourth aspects, the timing extraction circuit (3A) includes a plurality of comparison circuits (32), an integration circuit (37), and a holding circuit (33). The comparison circuit corresponds each of second thresholds and generates a binary signal (S3) indicating whether or not the combined signal is a corresponding second threshold or larger. The integration circuit generates, based on a plurality of binary signals from the respective comparison circuits, an integrated signal (S30) that indicates timings of respective comparison results in an integrated manner. The holding circuit holds the timing information (D3) for a predetermined period until the timing indicated by the detection signal based on the integrated signal.

As a seventh aspect, in the light detection device of the fifth or sixth aspect, the detection circuit includes a delay circuit (17) that delays the detection signal by a predetermined delay period to output the delayed detection signal to the holding circuit. At least one of the second thresholds is larger than the first threshold.

As an eighth aspect, in the light detection device according to any one of the first to seventh aspects, the first threshold is set based on a maximum value of the combined signal.

A ninth aspect includes a light projector (20) that projects light, and the light detection device according to any one of the first to eighth aspects. The time measurement circuit in the light detection device measures the count period using a timing at which the light projector projects light as the detection start timing.

A tenth aspect is a light detection method by which a light detection device (1) including a plurality of photosensors (10a to 10c) detects incident light according to a detection start timing. The present method includes: receiving light at the plurality of photosensors to generate each of output signals (Sa to Sc) indicating light reception results; and summing the plurality of output signals (Sa to Sc) from the respective photosensors to generate a combined signal (S1). The present method includes: detecting a timing at which the combined signal reaches a first threshold (V1) or larger to generate a detection signal (S2) indicating the detected timing; and measuring a count period (T2) between the detection start timing and the detected timing based on the detection signal. The present method includes acquiring timing information indicating a timing at which the combined signal increases in a predetermined period defined by the detected timing as a reference.

REFERENCE SIGNS LIST 1, 1A, 1B light detection device
10a to 10c SPAD
13 signal combining circuit
14, 14A detection circuit
2 optical distance sensor
20 light projector 3, 3A timing extraction circuit
32 comparison circuit
33 holding circuit
37 integration circuit
4 TDC
5 calculator

The invention claimed is:

1. A light detection device for detecting incident light according to a detection start timing, the light detection device comprising:
   a plurality of photosensors configured to receive light to generate output signals indicating light reception results, respectively;
   a signal combining circuit configured to sum the plurality of output signals from the respective photosensors to generate a combined signal;
   a detection circuit configured to detect a timing at which the combined signal reaches a first threshold or larger to generate a detection signal;
   a time measurement circuit configured to measure a count period between the detection start timing and the detected timing based on the detection signal; and
   a timing extraction circuit configured to extract timing information from a predetermined period defined by the detected timing as a reference, the timing information indicating a timing at which the combined signal increases.

2. The light detection device according to claim 1, the photosensors are single photon avalanche photodiodes each configured by an avalanche photodiode operated in a Geiger mode.

3. The light detection device according to claim 1, further comprising a calculator configured to calculate a period from the detection start timing to the timing indicated by the timing information based on the extracted timing information and the measured count period.

4. The light detection device according to claim 3, wherein the calculator is configured to execute statistical processing based on the calculated period and the count period.

5. The light detection device according to claim 1, wherein the timing extraction circuit comprises:
   at least one comparison circuit each corresponding to a second threshold, and configured to generate a binary signal indicating whether or not the combined signal is the second threshold or larger; and
   a holding circuit corresponding to each comparison circuit, and configured to hold timing information which is based on the binary signal obtained from a corresponding comparison circuit for a predetermined period until the timing indicated by the detection signal.

6. The light detection device according to claim
   wherein the detection circuit comprises a delay circuit configured to delay the detection signal by a predetermined delay period to output the delayed detection signal to the holding circuit,
   wherein at least one second threshold is larger than the first threshold.

7. The light detection device according to claim 1, the timing extraction circuit comprises:
   a plurality of comparison circuits each corresponding to each of second thresholds, and configured to generate a binary signal indicating whether or not the combined signal is a corresponding second threshold or larger;
   the integration circuit is configured to generate, based on a plurality of binary signals from respective comparison circuits, an integrated signal that indicates timings of respective comparison results in an integrated manner; and
   the holding circuit is configured to hold the timing information for a predetermined period until the timing indicated by the detection signal based on the integrated signal.

8. The light detection device according to claim 1, wherein the first threshold is set based on a maximum value of the combined signal.

9. An optical distance sensor comprising:
   a light projector configured to project light; and
   the light detection device according to claim 1,
   wherein the time measurement circuit in the light detection device is configured to measure the count period using a timing at which the light projector projects light as the detection start timing.

10. A light detection method by a light detection device comprising a plurality of photosensors for detecting incident light according to a detection start timing, the method including:
   receiving light at the plurality of photosensors to generate each of output signals indicating light reception results;
   summing the plurality of output signals from the respective photosensors to generate a combined signal:
   detecting a timing at which the combined signal reaches a first threshold or larger to generate a detection signal indicating the detected timing;
   measuring a count period between the detection start timing and the detected timing based on the detection signal; and
   acquiring timing information indicating a timing at which the combined signal increases in a predetermined period defined by the detected timing as a reference.

* * * * *